US006404876B1

(12) United States Patent
Smith et al.

(10) Patent No.: US 6,404,876 B1
(45) Date of Patent: Jun. 11, 2002

(54) SYSTEM AND METHOD FOR VOICE ACTIVATED DIALING AND ROUTING UNDER OPEN ACCESS NETWORK CONTROL

(75) Inventors: Robert C. Smith, Grapevine, TX (US); George Demetrios Karis, Cambridge, MA (US)

(73) Assignees: GTE Intelligent Network Services Incorporated, Irving, TX (US); Verizon Laboratories Inc., Waltham, MA (US)

(*) Notice: Subject to any disclaimer, the term of this patent is extended or adjusted under 35 U.S.C. 154(b) by 0 days.

(21) Appl. No.: 08/936,957

(22) Filed: Sep. 25, 1997

(51) Int. Cl.$^7$ ............................. H04M 1/64; H04M 3/42
(52) U.S. Cl. ............................ 379/218.01; 379/88.01; 379/88.07; 379/201.07; 379/207.12; 379/88.17; 379/913
(58) Field of Search ..................... 379/67.1, 71, 72, 379/80, 88.01–88.04, 88.07, 88.08, 88.16, 88.18, 88.23, 203, 260, 88.25, 213, 223, 83, 88.19, 88.2, 142.07, 142.15, 201.01, 201.02, 201.06, 201.07, 207.12, 218.01, 218.02, 219, 88.13, 88.17, 913; 704/231, 234, 251, 275, 243, 246, 250, 255, 256

(56) References Cited

U.S. PATENT DOCUMENTS

| | | | | |
|---|---|---|---|---|
| 4,979,206 A | * | 12/1990 | Padden et al. ............. | 379/88.01 |
| 5,003,584 A | * | 3/1991 | Benyacar et al. ........... | 379/119 |
| 5,163,083 A | * | 11/1992 | Dowden et al. ........... | 379/88.03 |
| 5,329,608 A | * | 7/1994 | Bocchieri et al. .......... | 395/2.52 |
| 5,353,336 A | * | 10/1994 | Hou et al. .................. | 379/67 |
| 5,452,340 A | * | 9/1995 | Engelbeck et al. ........ | 379/67.1 |
| 5,488,652 A | * | 1/1996 | Bielby et al. .............. | 379/88 |
| 5,563,933 A | * | 10/1996 | August et al. ............. | 379/115 |
| 5,594,784 A | * | 1/1997 | Velius ........................ | 379/88 |
| 5,627,887 A | * | 5/1997 | Freedman ................... | 379/144 |
| 5,638,425 A | * | 6/1997 | Meador, III et al. ........ | 379/88 |
| 5,675,704 A | * | 10/1997 | Juang et al. ............... | 704/246 |
| 5,724,481 A | * | 3/1998 | Garberg et al. ........... | 395/2.52 |
| 5,757,904 A | * | 5/1998 | Anderson ................... | 379/265 |
| 5,812,972 A | * | 9/1998 | Juang et al. ............... | 704/234 |
| 5,901,214 A | * | 5/1999 | Shaffer et al. ............. | 379/220 |
| 5,940,793 A | * | 8/1999 | Attwater et al. ........... | 704/231 |
| 6,122,361 A | * | 9/2000 | Gupta ........................ | 379/223 |
| 6,148,261 A | * | 11/2000 | Obradovich et al. ....... | 701/208 |
| 6,208,713 B1 | * | 3/2001 | Rahrer et al. .............. | 379/67.1 |

\* cited by examiner

*Primary Examiner*—Allan Hoosain
(74) *Attorney, Agent, or Firm*—Leonard Charles Suchyta; James K. Weixel

(57) ABSTRACT

System and method for deriving call routing information utilizing a network control data base system and voice recognition for matching spoken word sound patterns to routing numbers needed to set up calls. Public access is provided to a common database via a common access number or code. Terminating parties sponsor the call and originating parties need not be pre-subscribed to use the service. The common access number is used to initiate or trigger the service. The system advantageously operates under the direction of a service control point, which combines technologies for switching, interactive voice response, and voice recognition with the data base to automate the processes of assisting callers in making calls for which they do not know the phone number. Usage information is gathered on completed calls to each terminating party for billing. Three alternative deployments in the U.S. telephone network are described, and vary based on the location of the service control points or intelligent processors and the degree of intelligence within the network.

72 Claims, 9 Drawing Sheets

| BUSINESS TYPE | 910 | AREA CODES/NXX | | 920  915 | |
|---|---|---|---|---|---|
| | | 212-222 | 212-223 | 212-224 | 212-225 |
| | AUTO REPAIR | GOODYEAR | GOODYEAR | GOODYEAR | GOODYEAR |
| | | FIRESTONE | FIRESTONE | FIRESTONE | FIRESTONE |
| | | SEARS | SEARS | SEARS | SEARS |
| | | WALMART | WALMART | WALMART | WALMART |
| | | MEL'S GARAGE | HERZOG BROTHERS | A1 AUTO REPAIR | SERVICE 1 |
| | | AL'S AUTOMOTIVE | AL'S AUTOMOTIVE | CAR CARE | JOE'S GARAGE |
| | | ETC. | ETC. | ETC. | ETC. |
| | AUTO RENTAL | HERTZ | HERTZ | HERTZ | HERTZ |
| | | NATIONAL | NATIONAL | NATIONAL | NATIONAL |
| | | AVIS | AVIS | AVIS | AVIS |
| | | ENTERPRISE | ENTERPRISE | ENTERPRISE | ENTERPRISE |
| | | ETC. | ETC. | ETC. | ETC. |

925

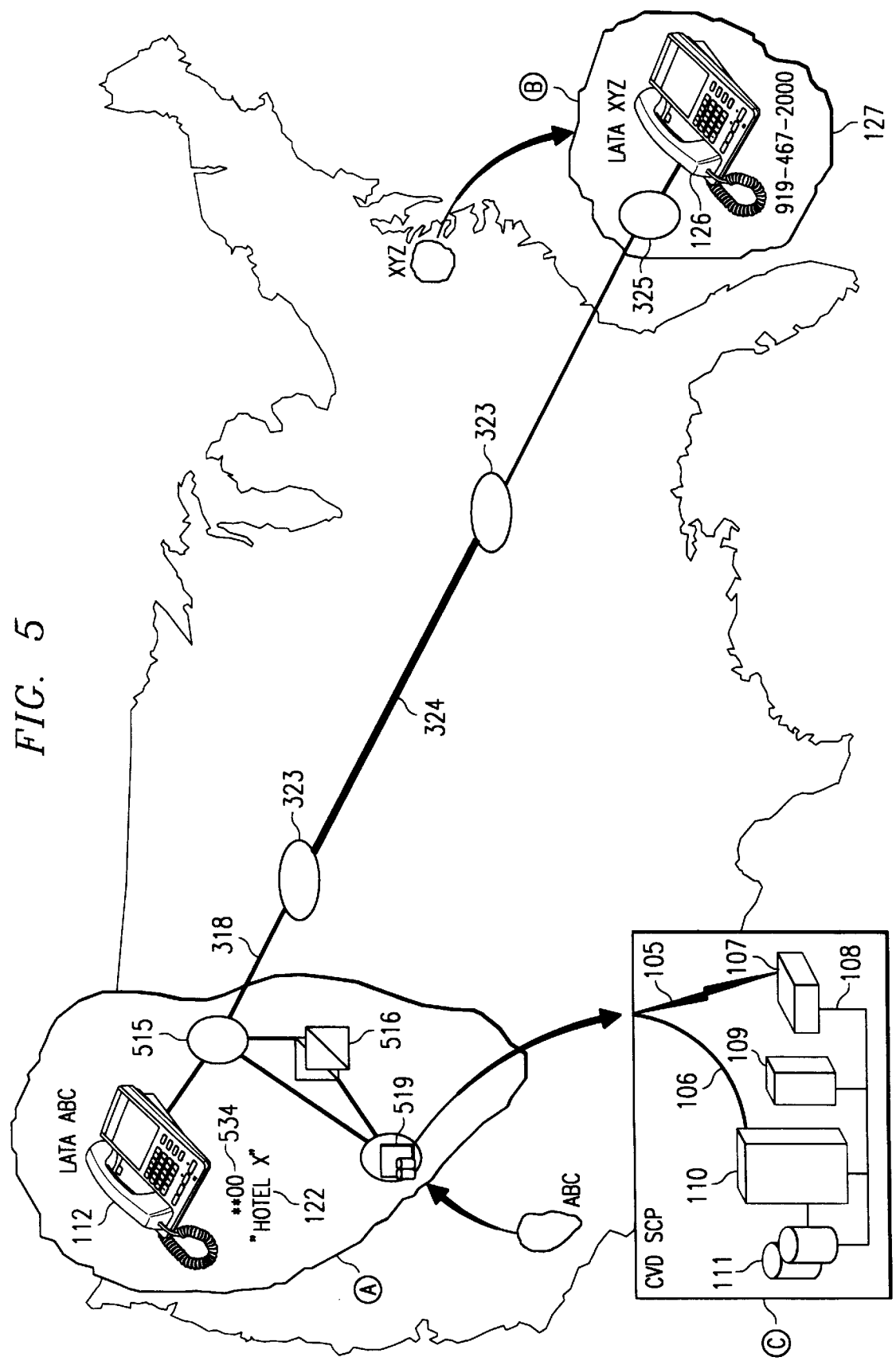

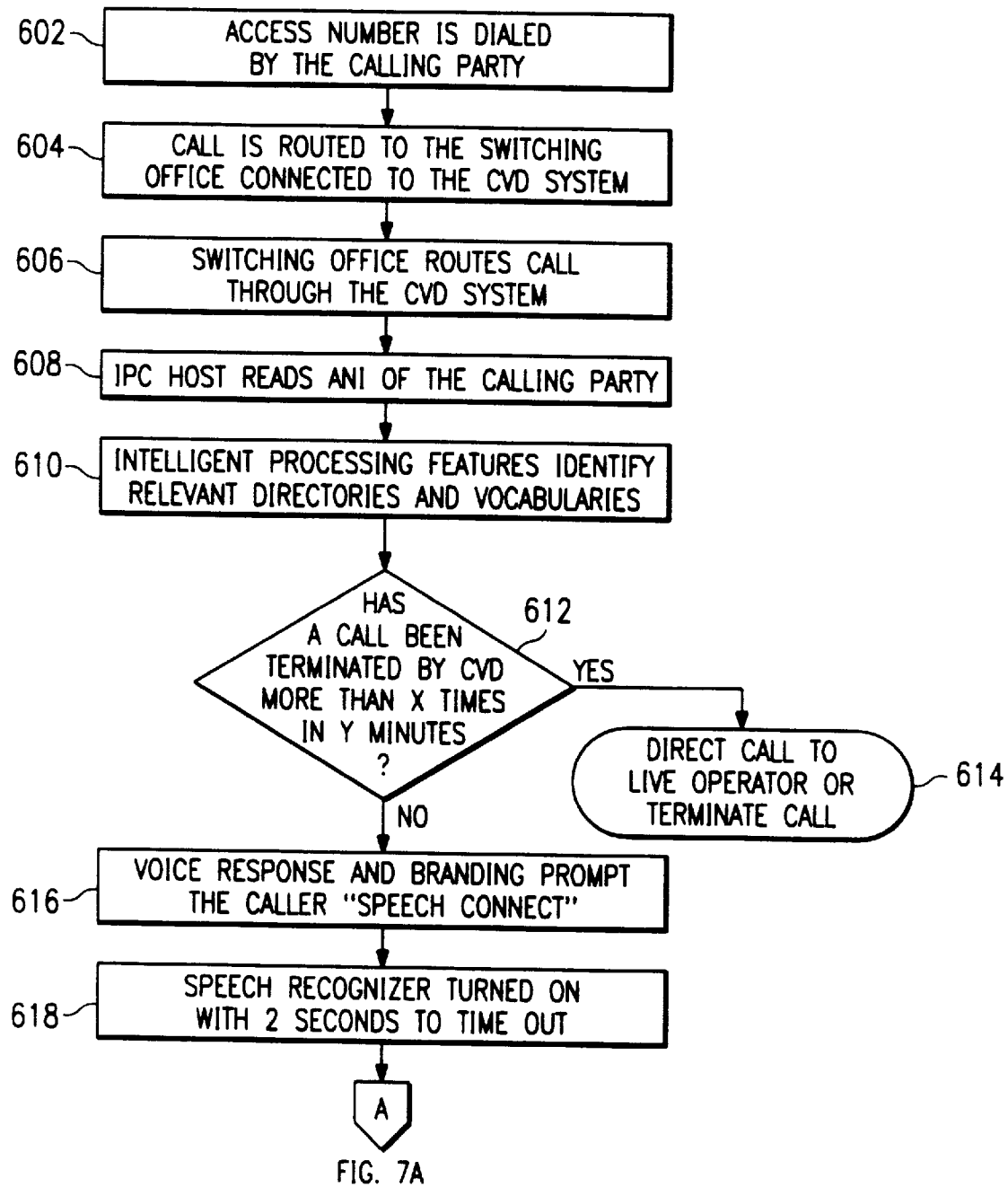

SYSTEM AND METHOD FOR VOICE ACTIVATED DIALING AND ROUTING UNDER OPEN ACCESS NETWORK CONTROL

TECHNICAL FIELD OF THE INVENTION

This invention relates to telecommunications systems and more particularly to a system and method in which a called party may be identified by voice command and reached universally, without digit dialing, and under open access network control.

BACKGROUND OF THE INVENTION

The need to continually improve the efficiency and precision with which telephone callers may specify and be connected to a desired called party is as old as the telephone system itself. It is well known that long before technology was developed for direct dialing and automated switching, telephone lines were connected to a manual exchange, where live operators plugged cords in and out of jacks to make connections at the voice request of the caller. As telephone usage became more widespread, the use of numeric direct dialing technology eventually replaced the need for live operators to make physical connections. A fundamental problem with numeric direct dialing, however, is that the caller has to know, and subsequently remember, the telephone number of the party desired to be called. In fact, one distinct advantage of the antiquated manual exchange system was that all the caller had to do was speak the name of the called party and the operator could make the connection based on no more than that instruction.

Various technologies are known in the art that are directed to assist a caller reaching a called party with reduced reliance on already knowing a specific number. Some of these technologies are described below:

800 and Vanity Numbers

Digit-dialed 800, or INWATS, has been around for several decades. The data base call processing method for the 800 number using out of band signaling has enhanced the functionality of INWATS with flexible band assignment, making it more economical and efficient. It has also made possible a single portable 800 number that could be used by a subscribing entity with multiple locations, and for terminating calls to be distributed based on variables such as their origination point, time of day, day of week, etc. INWATS has been a commercially successful and valuable tool for businesses and other entities who use it to encourage calls from customers, prospects or constituents.

These benefits of the 800 number are nonetheless still subject to the problem of potential customers remembering the 800 number to initiate a call. Vanity numbers (phone numbers that spell a name or phrase) are often used by businesses to facilitate recall of their telephone numbers by customers, and thus are in high demand. By using the alpha characters assigned to each number on a telephone dial or keypad, vanity numbers enable a customer to recall an easily remembered word or phrase rather than a number, which may be more difficult to remember.

Numbers for 800 service are assigned to businesses on a first-come, first-serve basis. Vanity numbers have proven to be very effective in increasing telephone business for their owners. While they are in high demand, however, good vanity numbers are limited in supply. Vanity numbers constrain the subscriber to seven character words or phrases. Due to the common sequence of consonants and vowels needed to create a seven letter word or phrase, very few vanity numbers are left to meet current and future demand. Further, as the universe of available vanity numbers diminishes, they cease to be particularly useful as an aide-memoir as they become less descriptive of the name or the nature of the business owning the number. This lack of vanity number availability also places businesses owning a good vanity number somewhat serendipitously at a considerable competitive advantage over emerging businesses.

Voice Activated Dialing

Prior art voice activated dialing utilizes voice recognition technology to allow the caller to subscribe to a service and then be able to call other parties by speaking a key word or phrase into their receiver such as the called party's name, title or a location (e.g., "call Mike," "call doctor," or "call home.") This can be done as soon as the phone is off hook, but may also be activated via an access or activation number or code. Typically a stand alone voice recognition processor is located in a local central office near the subscriber as an adjunct to the switch. A unique file is set up for each calling subscriber who is at liberty to populate it with key words of the subscriber's choosing. Except for system maintenance, no one but the subscriber has access and control of the calling file in the data base. While most current applications of voice activated dialing involve a data base housed in a local central office, there are also technologies that place this function either in the customer's telephone equipment, or in a central open access network location.

While existing voice dialing inventions are perhaps appealing for their technical novelty, they provide little more utility than the programmable speed dialing keys that may be found on many telephones. Both features merely eliminate the need for the caller to dial the entire number manually when calling within a small personalized universe of frequently-called numbers, most of which the caller usually knows by heart anyway. Both generally reduce the time for manual dialing. In most cases, however, voice activated dialing is more costly than speed dialing to the user. Voice activated dialing does add utility over speed dialing for situations where hands need to be free such as while driving, or where the user may be visually or physically impaired. It may provide access to more numbers than is typical for most phone equipment with speed dialing capabilities. It is expected, however, that the demand for voice activated dialing will be limited to a small number of subscribers willing to pay for the service.

Further, since the originating subscriber defines the words and phrases that will be used to identify called parties, and since use is expected to involve only a small portion of the population, the prior art application of voice activated dialing is of little value to called parties such as businesses interested in increasing telephone traffic by making it easier for prospects to call them.

Moreover, existing voice activated dialing services are generally limited in the number of terminating locations that can be reached, based on the set of names per subscriber. Currently, a typical subscriber data file has a limited capacity of approximately 60 names for initiating voice activated calls. The number of businesses that will benefit from open access network control voice activated dialing exceeds this current 60 name per subscriber capacity within existing technology. In all probability, only a small fraction of a business's market or potential customers will actually be subscribed to voice activated dialing. In fact, most businesses will hope to generate business from customer prospects who, even if they are voice activated dialing subscribers, will most likely not have programmed the business's name into their personal voice dialing file. Businesses will want to be in control of making their name accessible to their entire market. Thus, unless voice activated dialing is made available to all potential customers, it is of little value to businesses trying to attract telephone commerce.

Voice Activated 1+ Information

Voice activated 1+ Information allows a caller to use voice activated dialing to initiate a call to live operator for directory assistance. Once the operator has provided the number, the call can be automatically set up without the caller having to dial the number manually. While providing value in situations where hands need to be free, such as while driving, this service is of no special value to commercial terminating parties wishing to increase telephone traffic. First, the caller must pay for the service, and normally at a price per call greatly in excess of manual dialing because of the cost of live operator intervention. Callers therefore tend to use the service only when there is no other alternative. Second, 1+ Information is generally a localized service, and operators normally require callers to make additional long distance calls to other LATAs when the terminating party is not found in the region covered by their service. This increases the cost to the caller. Third, the caller is often required to know the area code in which the terminating party may be found before either local or long distance 1+ Information operators can help. Clearly, a service in which one number, advantageously toll-free, may be called to enable subsequent connection by voice activated dialing would improve on 1+ Information services.

Universal Number Access

Many commercial organizations and businesses have stores or offices located in multiple geographic locations to be near the customers they serve. It is well known in the art that such businesses often use 800 or similar toll-free numbers to attract calls to a central location, at which point the call is then routed to the business location nearest the caller. The businesses must pay for the costs associated with the initial 800 call that was toll-free to the caller, and then the cost of routing and then connecting to the local location. Further, the toll-free number is susceptible to all the problems of being identified and remembered by the caller as set forth above in the section discussing vanity numbers. It would be clearly advantageous and cost-effective to such businesses to be able to promote a single universal number that could automatically direct calls to the business location nearest the originating point of the call without having to route the call through a central location.

SUMMARY OF THE INVENTION

The present invention is directed to voice activated dialing as controlled in an open access network. Its specific application and preferred embodiment as described herein is Commercial Voice Dialing (hereafter also "CVD"), a system and method that uses voice recognition technologies to allow anyone using any phone on the public network to enter an access code and/or number, and then speak the name, key word, or phrase of a subscribing business or commercial party to which they desire to be connected. From the following description it will be appreciated that CVD is one specific commercial application of the present invention, and that a preferred embodiment herein is directed to a system and method in which such businesses are advantageously identified and reached through an "800" or similar toll environment. It will be nonetheless understood by those in this art that the present invention is expressly not limited to this particular application and its embodiment, and may in fact be used in any open access network in which voice dialing with improved automated speech recognition accuracy may be advantageous in assisting callers to identify and reach a desired called party, or "terminating party" as also referred to hereafter.

It will be further understood by those in this art that the present invention is not limited to specific architectures or deployments on a telecommunications network. The presently preferred embodiment described herein uses an Intelligent Network (IN) to control the system, advantageously implementing remote and decentralized call processing and control through interconnected Service Control Points (SCPs). It will be nonetheless appreciated by those of skill in this art that the present invention may also be deployed using traditional architecture located at one or more centralized Service Nodes (SNs), advantageously also employing Intelligent Peripherals (IPs) to facilitate call processing and control.

Further, by being under network control, the service is not dependent on a designated line and is thus available to users anywhere on the Public Switched Telephone Network ("PSTN"). Generally, the system solicits callers to speak the name of a desired terminating party, which advantageously is the name of a subscribing business. The system will then run the caller's voice signals against records in one or more databases, and when a match is made, will connect the caller to the matched terminating party. Advantageously, the subscribing business (or other entity interested in receiving calls) pays for the service much the way that the toll charges on "800" calls are paid for. The present invention nonetheless also contemplates and discloses an embodiment in which the calling party may pay for calls. The quantity of word-to-routing number translations, or call completions using CVD is recorded for billing. Callers may access the service using an 800 number, a common access code, or an abbreviated number. CVD involves network control voice activated call routing using one or several common central service control point(s) and data base(s).

As noted, a preferred embodiment herein uses an Intelligent Network ("IN") to control the system. In such an environment, a specific incoming access code and/or number is recognized and triggers the IN to activate voice recognition capabilities for a call. An initial voice transport link is set up between the caller and an Intelligent Peripheral ("IP") within the IN. A local Intelligent Service Control Point ("ISCP") then allows calls to be set up to the terminating party, dropping the initial voice transport link once a direct link has been set up between the calling and terminating parties.

One technical advantage of using an IN in this way is that once the terminating party has been identified, the link between the calling party and the terminating party may be monitored and maintained by software in the IP within the IN, and the call itself need never be routed through the Service Node. This technical advantage distinguishes the present invention over traditional switch vendor solutions, in that although calls will still be routed to an IP to enable voice communication of the callname utterance, no more than a single toll link need be active at any point during the call, regardless of whether the call is made to the IP from within the exchange or from outside the exchange. Thus, the call itself need never be routed through the Service Node.

A further technical advantage of using an IN in this way is that by reading the Automatic Number Identification ("ANI") of the caller, the IN may recognize calls incoming to a business with multiple locations, and may then direct the calls to the business locations that are nearest to the calling parties. The call may thereby be connected without voice trunks crossing LATA boundaries. Such call processing is enabled by voice recognition in the ISCP that matches the spoken name of the called business to routing information to be provided by the business.

It will therefore be understood that CVD may be made available to virtually all telephones on the PSTN, limited only by the preferences of the businesses on the CVD platform. The originating party need not be pre-subscribed to any voice dialing services to use CVD. It will also be appreciated that CVD applies not only to intercarrier toll calls, but to the many local customer-to-business calls that ordinarily do not involve toll charges.

The foregoing description illustrates a further advantage of the present invention in that it will serve both calling and terminating parties by eliminating the need for remembering or looking up numerous telephone numbers. Reliance on vanity numbers is dramatically reduced, since subscribers to CVD are no longer required to look to a limited supply of vanity numbers, most of which may not be particularly descriptive of the business or even convenient to remember. The role of directory services such as telephone books and live operator information services is also diminished. This brings economic advantages to the operation of a telephone service as a whole. Additional peripheral advantages will also be appreciated, such as facilitating telephone service for the handicapped, or for mobile/cellular users without access to a telephone directory and for whom hands-free operation allows other activities, such as driving, to be conducted more safely. Additionally, the subscribing business may receive one periodic invoice for the service, itemizing all CVD connections regardless of origin or PSTN connection route.

As described, another advantage of the present invention that it is under open access network control. As a result, CVD is available from any location on the PSTN, and not just exclusively from one or more designated phone lines. This feature is useful to all businesses, who then become more easily reachable by telephone by all their potential customers regardless of the Local Exchange Carrier ("LEC") or Inter-exchange Carrier ("IXC") to which they or their customers subscribe, and without any of those customers required to be pre-subscribed to an end user voice-activated dialing service. Further, smaller and remote communities, whose subscriber bases might otherwise be too small by themselves to economically justify voice dialing deployment, may be served instead by a CVD system physically deployed in a larger, distant community of subscribers.

The open access network control feature is also highly advantageous in that it represents a flexible technology that will be highly responsive to future developments in the applicable arts without extensive modification. The topology is easily adaptable to multiple systems and platforms, and to various commercially available hardware and software products. As a result, there is no need for investment in a single proprietary technology. A wider variety of competitive new products may thus be selected from, which, when integrated and updated, will ensure the system performs well and keeps pace with technology advances for years to come.

A still further technical advantage of CVD is that it features intelligence in the IN that analyzes speech characteristics of the calling party, the geographic location of the calling party, and the geographic location of the terminating party against stored data. This intelligence then uses the results to identify sets of businesses most likely to be of interest to the caller, and also adapts voice recognition to interpret the caller's utterances more accurately. As a result, the effective performance of the system is optimized, because the caller's utterances will be compared against a smaller vocabulary of entries, and with more precision. This may in turn reduce the amount of input and interaction expected of the calling party in identifying and being connected to the desired terminating party. Examples of this intelligence, to be described more fully below, include:

(a) Identifying the ANI and/or zip code of the calling party to a likely set of local, regional and national businesses;

(b) Identifying "pointer" words within a calling party's utterance to pre-defined groups of business types likely to include the desired terminating party;

(c) Expecting speech patterns and accents indigenous to particular geographic areas from calls incoming from those areas;

(d) Identifying a particular speech pattern or accent and adapting voice recognition to it;

(e) Identifying specific calling parties, or groups thereof, to a particular set of local, regional and national businesses based on statistics and historical/predicted calling patterns;

(f) Identifying calling parties speaking in a specific language to a particular set of local, regional and national businesses developed for speakers of that language; and (g) Recognizing when the communications device being used by the calling party is a non-standard handset, such as a mobile phone or a speaker phone, and then adapting voice recognition to reception peculiarities expected of that type of communications device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a diagram illustrating a deployment of the present invention in the U.S. telephone system using an intelligent network.

FIG. 6 is a flow chart describing the first part of the call flow logic of the present invention.

DESCRIPTION OF THE PREFERRED EMBODIMENTS

Figure 1:
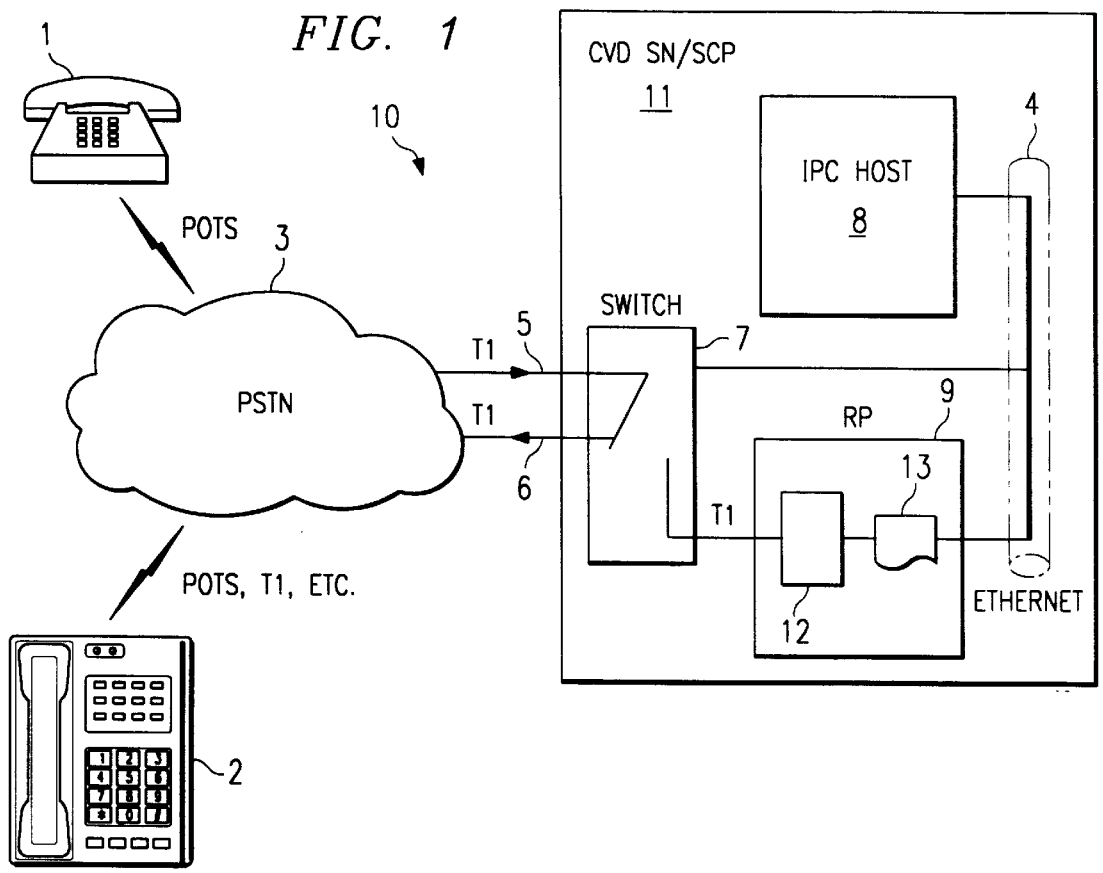
FIG. 1 is a high level block diagram illustrating the conceptual topology of the present invention.

Turning first to FIG. 1, which is a diagram of the topology of the present invention at a very high conceptual level, it will be seen that CVD system 10 includes CVD calling party 1 who desires to make contact with a CVD-accessible terminating party 2 located remotely. Calling party 1 makes the call over a "Plain Old Telephone Service" (POTS) line through the Public Switched Telephone Network (PSTN) 3. The call may advantageously be a local call, or an 800 or similar call toll-free to calling party 1. PSTN 3 routes the call via inbound line 5, advantageously a T1, to CVD Service Node/Service Control Point (SN/SCP) 11.

As noted above, the present invention is not limited to specific architectures and/or deployments. The embodiment described below discloses using Service Control Point (SCP) architecture and deployment in an Advanced Intelligent Network (AIN) environment. It will nonetheless be understood that the present invention may also be enabled in traditional Service Node (SN) environments, advantageously using Intelligent Peripherals (OPs) to facilitate call processing and control.

It will further be understood that the level of sophistication in call routing to CVD SN/SCP 11 will depend on the level of Advanced Intelligent Network (AIN) service deployed. As will be described below, "routing" the call may involve an embodiment hereof in which the call is physically switched to CVD SN/SCP 11 before being routed to terminating party 2. Alternatively, it will be understood that another embodiment hereof may instead route control information to CVD SN/SCP 11 for further processing while the call is held at a Service Switching Point (SSP) nearer to its point of origin. In this latter embodiment, it will be further understood that CVD SN/SCP 11 will be acting as a Service Control Point (SCP) in providing information to the SSP for the onward routing of the call.

Regardless of the switching configuration, CVD SN/SCP 11 conceptually comprises three major system elements. Each element provides a separate function, and advantageously is scaleable to accommodate variations with respect to the reliability and scaleability requirements of particular CVD deployments. As illustrated on FIG. 1, these major elements are matrix switch 7, Intelligent Peripheral Controller (IPC) Host 8, and Resource Platform (RP) 9. These elements are interconnected via ethernet 4. RP 9 may also take information directly from matrix switch 7, advantageously through another T1 line. Matrix switch 7 may be programmable, for example of a type currently manufactured by Excel or Summa Four.

Also as illustrated on FIG. 1, RP 9 includes one or more Integrated Voice Recognition and Response (IVRR) units 12, each working in conjunction with voice recognition software 13. IVRR units 12 may be selected from numerous shelf products currently manufactured by, for example, IBM, Bellcore, Convex, VCS or InterVoice.

It will be appreciated that the foregoing architecture advantageously supports standard interfaces at a resource level to allow the integration of capabilities and products available from multiple vendors. In this way, CVD provides the flexibility necessary to offer multiple types of disparate resources to service a single CVD telephone connection. Additionally, this architecture facilitates the expansion of functions and resources.

Once the call is received by CVD SN/SCP 11 at matrix switch 7 through inbound T15, IPC Host 8 directs RP 9 to analyze the voice patterns of utterances spoken by calling party 1 against data stored in, or otherwise accessible to IPC Host 8. The goal of this analysis is to make a match to the identity of terminating party 2 using voice information provided by calling party 1 in combination with Automated Speech Recognition (ASR) techniques. This analysis may involve one or more levels of sophistication as described in further detail herein. For example, calling party 1 may simply give the name of the terminating party 2, in which case the analysis would require straight matching against stored data. In another example, calling party 1 may have to make one or more choices against other stored data before the desired terminating party 2 can be identified.

IPC Host 8 also contains, or has access to, further intelligence in which calling party 1's voice information may be matched with more precision to identify desired terminating party 2. As described in more detail herein, this intelligence may include accent or language matching features, regional and national terminating party subsets based on ANI or other call origin identifier, and predicted likely terminating parties based on historical calling patterns.

Once terminating party 2 has been identified, it will be seen from FIG. 1 that CVD SN/SCP 11 sends call routing instructions back to PSTN 3 via outbound line 6, again advantageously a T1. Again, depending on the embodiment selected, this "routing" may involve physical switching of the call or the sending of information to a remote SSP where the call is waiting for forwarding instructions. The call is then completed and calling party 1 is connected with terminating party 2.

Figure 2:
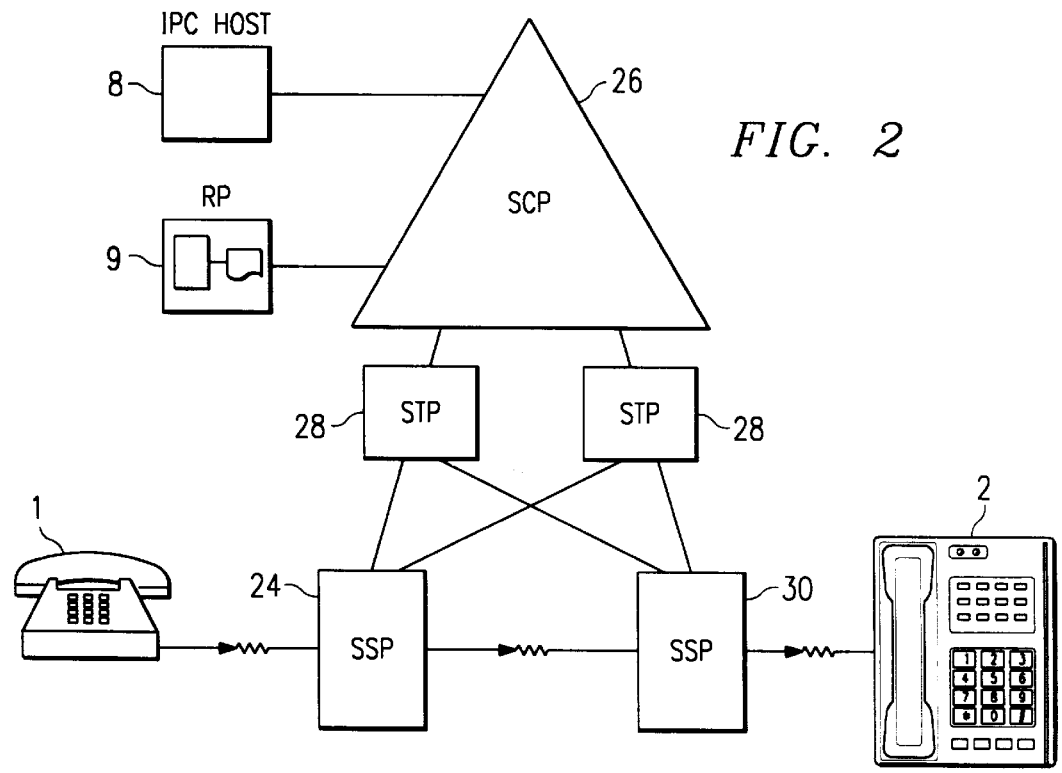
FIG. 2 is a high level block diagram illustrating exemplary architecture embodying the present invention.

Turning now to FIG. 2, an embodiment is illustrated as described in summary above, in which an Advanced Intelligent Network is employed to route calls from calling party 1 to terminating party 2 without physically routing the calls through a Service Node (SN). As noted above, calling party 1 will have previously dialed a number, advantageously local or 800, recognizable by the PSTN as intended to invoke the CVD service. The call is received by first Service Switching Point ("SSP") 24, which then routes information regarding the call to Service Control Point ("SCP") 26 via one or more Service Transfer Points ("STP") 28. SCP 26 includes IPC Host 8 and RP 9 as described above in detail with reference to FIG. 1. SCP 26 processes the information regarding the call against available matching data and improved matching intelligence as also described above, and identifies the particular terminating party 2 desired by calling party 1. SCP 26 then sends routing information via STP 28 to second SSP 30, whereupon a connection between calling party 1 and terminating party 2 is made.

Figure 3:
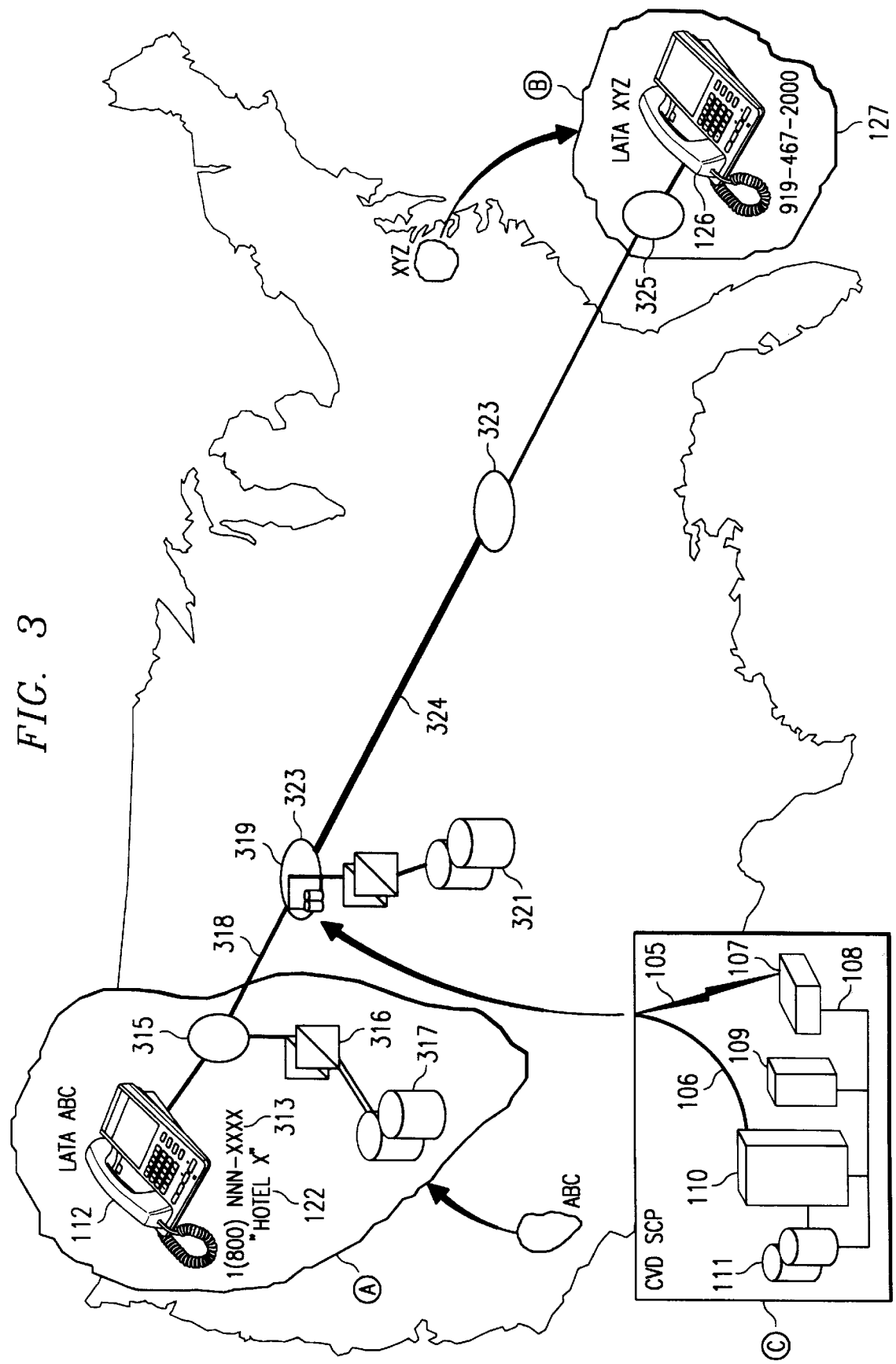
FIG. 3 is a diagram illustrating a deployment of the present invention in the U.S. telephone system using normal 800 access.
Figure 4:
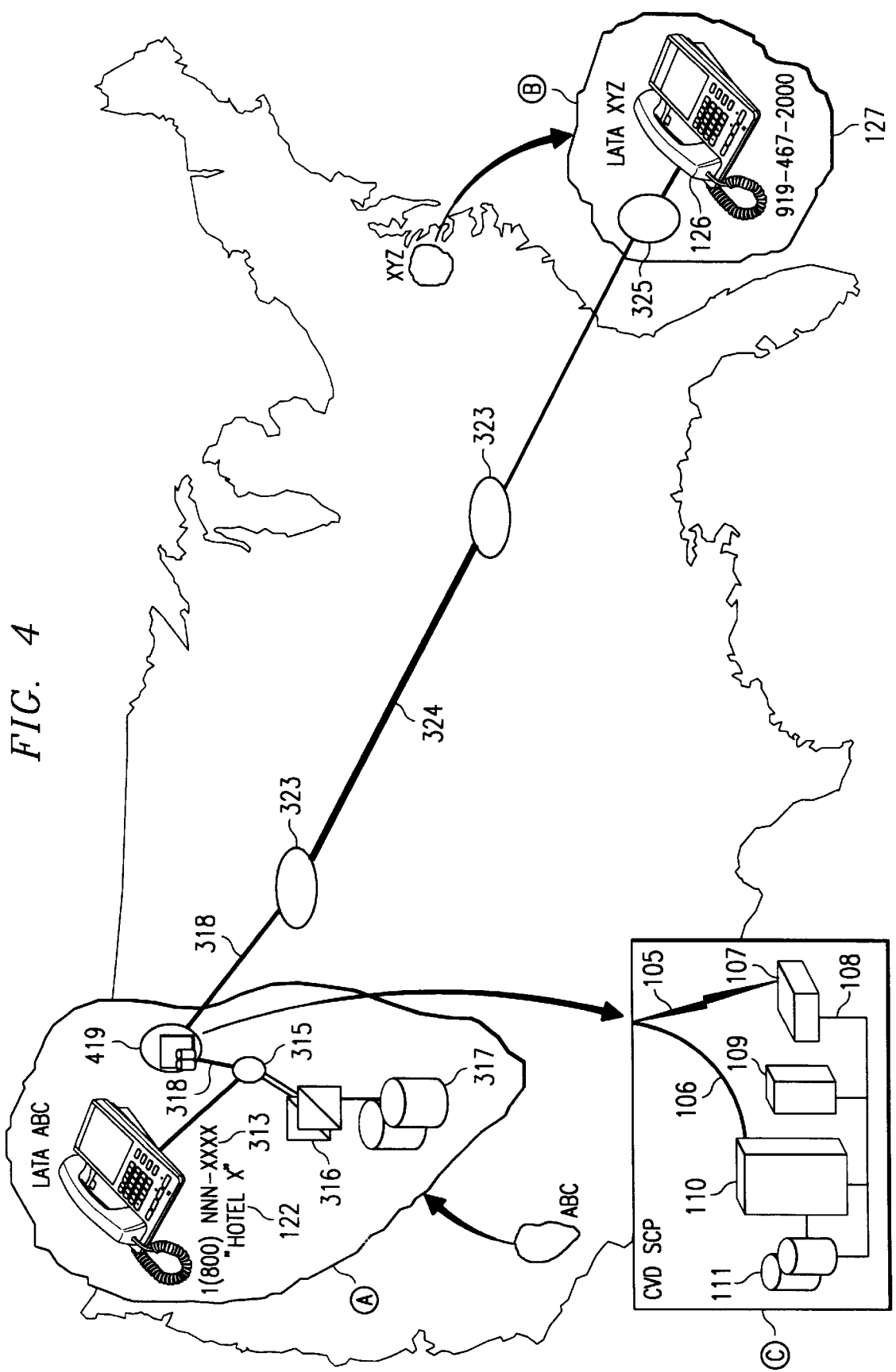
FIG. 4 is a diagram illustrating a deployment of the present invention in the U.S. telephone system using local 800 access.

Exemplary alternative deployments of the foregoing architecture in the U.S. telephone system are illustrated in FIGS. 3, 4 and 5. In each alternative, a calling party 112 in LATA "ABC" in the West U.S. is using key word 122 "Hotel X" in attempting to reach terminating party 126 (Hotel X) in the East U.S. by CVD. Terminating party 126 subscribes to CVD and may be found in LATA "XYZ." Without CVD, terminating party 126 would be reachable via POTS telephone number 127 ("919-467-2000").

In each of FIGS. 3, 4 and 5, enlargements A and B represent the architectures found within LATAs ABC and XYZ respectively to enable the deployments illustrated. Further, in each of FIGS. 3, 4 and 5, inset C represents an embodiment of the CVD architecture described in more detail above with reference to FIGS. 1 and 2. It will be seen that inset C is identical in each of FIGS. 3, 4 and 5. In each of insets C, IPC Host 109 is connected to other components via ethernet 108. Computer means 111 includes the Resource Platform containing IVRRs and voice recognition software, and the intelligence and stored data used by the system to match the caller's voice signals to a desired terminating party. Switch 110 includes the matrix switch through which voice signals may be routed to computer means 111 along voice line 106. Interface 107, connected via signaling line 105, allows the architecture to send and receive out-of-band signals, such as ANI, to facilitate activities such as call treatment and routing.

FIG. 3 illustrates a deployment using inter-exchange 800 access. Calling party 112 dials access number 313 for CVD ("1-800-NNN-XXXX"). LEC end office (EO) 315 reads the number and recognizes it as an 800 number.

If EO 315 is a service switching point (SSP), then a query is routed to service transfer point (STP) 316 for title translation. From STP 316 the number is then routed to the LEC's appropriate service control point (SCP) 317.

If EO 315 is not an SSP, EO 315 first sends the number to a designated SSP/AT for query/routing. SCP 317 reads access number 313 as above and provides the designated SSP/AT with the translated number and the assigned inter-exchange carrier. Inter-exchange carrier (IXC) receives the number and translates it to the POTS number for the commercial voice dialing (CVD) SCP (inset C).

EO 315 then sets up a trunk call 318 to office 319 that connects to CVD architecture. In this deployment, the CVD SCP is advantageously co-located at a facility such as an IXC office to minimize facility costs.

At the CVD SCP, signaling information carrying access number and ANI arrives via signaling line 105, and message is sent to IPC Host 109. IPC Host 109 and computer means 111 perform data look-up and instructs switch 110 to route this call to the speech recognizer within computer means 111. An electronic voice message prompts calling party 112 to speak the key word 122 ("Hotel X") for desired terminating party 126. When key word 122 is received, the voice recognition system in computer means 111 searches the data base to match the voice pattern spoken to the voice patterns on file in the data base.

If a match is made, then IPC Host 109 translates the pattern into the POTS number 127 for terminating party 126. Now knowing POTS number 127, IPC Host may then determine any special treatment for the call such as choice of carrier, choice of terminating locations based on time of day, day of week, load distribution and point of origination/ANI, etc.

Electronic voice response then repeats back key word 122 to confirm to calling party 112 that this is indeed desired terminating party 126. If a correct match was made, calling party 112 may remain silent, or say "yes," and call set-up is completed.

If, however, an incorrect match to desired terminating party 126 has been made, calling party 112 may advantageously respond in one of several ways. He may repeat key word 122, in which case a new match is attempted, or he may hang up before the connection is completed and then try again, or she may say "stop," "wait," or "no," in which case the call setup process is aborted and a request may be made to repeat key word 122.

Once POTS number 127 is identified, the second leg of the call may then be set up with a link from the CVD SCP to terminating party 126. Interexchange facilities are used (interexchange line 324, interexchange offices 323, terminating party's LEC switching office 325). The connection is completed and the conversation between calling party 112 and terminating party 126 takes place. Both legs of the call to and from the CVD SCP are maintained during the call by the CVD SCP. Once the call is complete, IPC Host 109 in the CVD SCP registers that a call has occurred and logs a call record, advantageously later to be used as a basis for invoicing for the service.

Returning momentarily to the point described above when the voice recognition system in computer means 111 searches the data base to match the spoken voice pattern spoken to those on file in the data base, if no match is made then electronic voice response tells calling party 112 that no match was made and requests calling party 112 to repeat key word 122. If on repeating a match is made, then the call is connected as described above. On the other hand, if on repeating for the second time no match is made, electronic voice response advantageously tells calling party 112 that a match could not be made. The call may then either be disconnected, or calling party 112 may be given the option to hold for a live operator for directory assistance. The call may then be routed to a directory assistance operator.

FIG. 4 illustrates deployment of the architecture of the present invention under local 800 access. Local 800 access works much the same as inter-exchange 800 access as described above with reference to FIG. 3, except that the CVD SCP is decentralized within LATA ABC, and thus no inter-exchange LATA facilities are necessary to transport calling party 112's voice to the CVD SCP for key word recognition and translation.

Thus, under this deployment, when SCP 317 reads access number 313 and recognizes it as a local 800 number, translation to the POTS number for the CVD service takes place within SCP 317, which houses the LEC's local 800 data base. The call is then routed to a local, and advantageously the nearest, exchange office 419 housing CVD.

Local residence of a CVD SCP facilitates differentiation between local terminating parties desired by calling party 112 and long-distance ones. Computer means 111 within the CVD SCP at local exchange office 419 may hold a data base of both local and national subscribers. The national set will advantageously be held at all CVD SCPs. Local sets will be held only at those local exchange offices to which they apply.

Once a match is made with key word 122 from calling party 112, translation into the POTS number for terminating party 126 allows differentiation as to whether the connection will be local or long distance. Although FIG. 4 illustrates an inter-exchange connection for long distance, it will be understood that if the connection was to be local, then switching within local exchange office 419 would enable the connection.

FIG. 5 illustrates a deployment of the architecture of the present invention with an intelligent network. In this case, the CVD SCP advantageously resides in LEC EO 515.

Under this architecture, many of the same processes as described above for 800 access take place, with several noted exceptions. A first difference is that access number 534 may be simplified. While callers generally may choose to continue to use an 800 number, they may advantageously also have the option of dialing a universal access code or an abbreviated number. Code and/or abbreviated number access will be dependent on recognition software available in the SSP at EO 515.

Whatever its format, once access number 534 is dialed, it is sent to the nearest available LEC EO 515 with a SSP, where access number 534 is recognized and the call is connected to a designated STP 516. STP 516 does the necessary title translation and locates and sets up a call to the nearest CVD SCP. A second difference of the intelligent network deployment over 800 access will thus be appreciated in that multiple CVD SCPs may be distributed throughout the network and called upon.

Key word matching and call connection is then made as for 800 access described above. Discrimination between local and inter-exchange connections may also be made as described above with reference to FIG. 4. Unlike 800 access, however, the intelligent network deployment illustrated in FIG. 5 makes it possible to drop the initial link to the CVD SCP once the work of setting up the call is completed.

Turning now to FIGS. 6, 7A, 7B, 7C and 8, flow charts are shown illustrating the flow of a typical call through the CVD system. Turning first to FIG. 6, the call flow is initiated by the Calling Party dialing the CVD access number (Block 602). As described in more detail with reference to FIGS. 3, 4 and 5, this call is then routed to the switching office housing the CVD system (Block 604). The switching office then routes the call through to the CVD system (Block 606).

Once in the CVD system, the IPC Host reads the ANI or other identifier of the calling party's origin (Block 608). At this point, intelligent processing features to be described in greater detail below associate the calling party's origin with relevant directories and vocabularies (Block 610). These directories and vocabularies may be a selected based on a likely set of local, regional and national businesses to be called, or expecting speech patterns or accents indigenous to a particular geographic area in which the ANI may be found.

The call flow then advantageously screens out calling parties who are either having extreme difficulty operating the service, or who are wasting the service's resources. CVD determines whether the calling party has been disconnected by the system multiple times in the last few minutes (Block 612). For example, attention might be given if the same calling party has been disconnected by CVD more than six times in the last ten minutes. If so, CVD may either connect this calling party to a live operator or automatically disconnect (Block 614). If, however, the calling party passes this test, then voice response and branding welcome the calling party to CVD, and prompt the calling party to "speech connect" (Block 616). CVD then enables its speech recognition capability, setting it to time out following a predetermined period (for example 2 seconds) of silence from the calling party (Block 618).

Figure 7A:
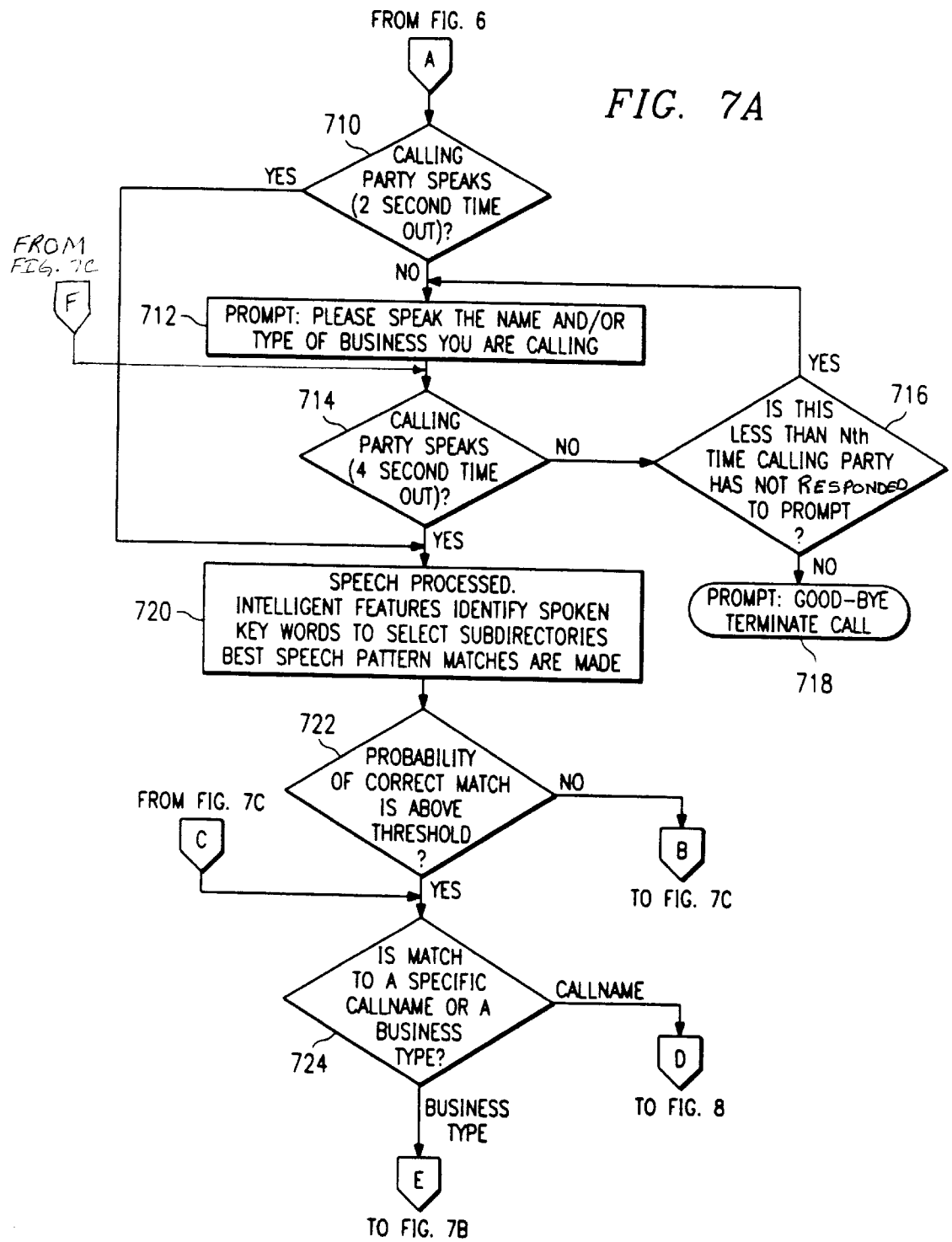
FIG. 7 is a flow chart describing the second part of the call flow logic of the present invention, and is depicted in three pieces, FIGS. 7A, 7B and 7C.

Turning now to FIG. 7A, CVD first waits the timeout period (as noted, for example, two seconds) to allow the calling party to initiate voice interactivity without further prompting (Block 710). If, after this period, CVD has not received any voice commands from the calling party, CVD prompts the calling party to speak the specific callname and/or the business type that is desired to be connected to (Block 712). Although not specifically illustrated on FIG. 7A, it should be noted that during this prompt, as with all other prompts in the CVD system, the calling party may advantageously interrupt with spoken commands. This feature is known in the art as "barge-in." During a barge-in, voice response within CVD detects the calling party's speech and immediately terminates the remainder of the prompt or the menu. CVD then acts in accordance with the calling party's spoken instructions.

It should be noted that ideally, as prompted in Block 712, the calling party will speak the callname (the name of the entity or business, for example, that the caller desires to reach) and the business type of the business desired to be connected to. For example, the caller might ideally say "Domino's Pizza" or "Baylor Hospital." In this way, if CVD is unable to recognize the specific callname as spoken, it may nonetheless be able to recognize the business type and orient further interactivity with the calling party from there. This step provides at least two advantages. First, in proceeding to identify a specific callname, the calling party need not be interrogated further as to the business type desired, since it has already been identified. Second, the population of potential businesses that the calling party may reasonably be expected to be trying to reach may also be immediately compartmentalized according to the recognized business type. Both advantages will tend to reduce processing time required for CVD to connect the calling party and will also optimize the amount of processing required to facilitate that connection.

It will be nonetheless understood that if the calling party does not speak both callname and business type together, CVD will still process the calling party's inquiry according to the utterance received. If the utterance is recognized as either a callname or a business type, then CVD will continue processing based on that recognition. On the other hand, if the utterance is not recognized, then CVD will prompt the calling party for a business type to compartmentalize the population of potential businesses into a smaller group before undertaking further callname matching.

Returning to FIG. 7A, therefore, upon being given a prompt to speak the callname and/or the line of business of the party desired to be connected to (Block 712), the calling party is then given a predetermined, reasonable period in which to make a spoken response. An example of such a time period is four seconds. The first few times that the calling party makes no response, the voice prompt repeats to give the calling party another opportunity to speak a specific callname or type of business (Block 716). If, however, the calling party fails to speak after further voice prompting, then CVD terminates the call (Block 718).

Assuming that the calling party has spoken a specific callname and/or a type of business, the system then searches information at its disposal for a speech pattern match (Block 720). In searching databases and other information available to it at that time, CVD may also advantageously employ various intelligent processing features described in further detail below. Such intelligent processing features may include identifying a particular speech pattern or accent and adapting voice recognition to it, or recognizing that the communications device being utilized by the calling party is a non-standard handset, and then adapting voice recognition to reception peculiarities expected of that type of communications device. Such features may also include further compartmentalizing of the vocabularies and directories already identified. As described in greater detail below, this further compartmentalizing associates pre-defined "pointer" words recognized in the calling party's utterance with specific types of businesses within the vocabularies and directories previously selected based on ANI in Block 610. Analogous compartmentalizing may similarly be enabled based upon recognition of a business type in the calling party's utterance.

Following the selecting, searching and matching processing shown on Block 720 on FIG. 7A, CVD next analyzes the results thereof to determine whether it has found a match to a specific callname or a business type that is better than a preselected matching threshold (Block 722). Advantageously, this matching threshold is 98%, although it will be understood that the present invention is not limited to a specific threshold.

If no match is made better than the threshold, then processing continues, as further described below on FIG. 7C, to try to identify a match using a replay/confirmation methodology. If, on the other hand, a match is made in Block 722 that is better than the threshold, then CVD next determines whether the match is to a specific callname or to a business type (Block 724). If the match is to a specific callname, then processing continues as further described below with reference to FIG. 8.

Figure 7B:
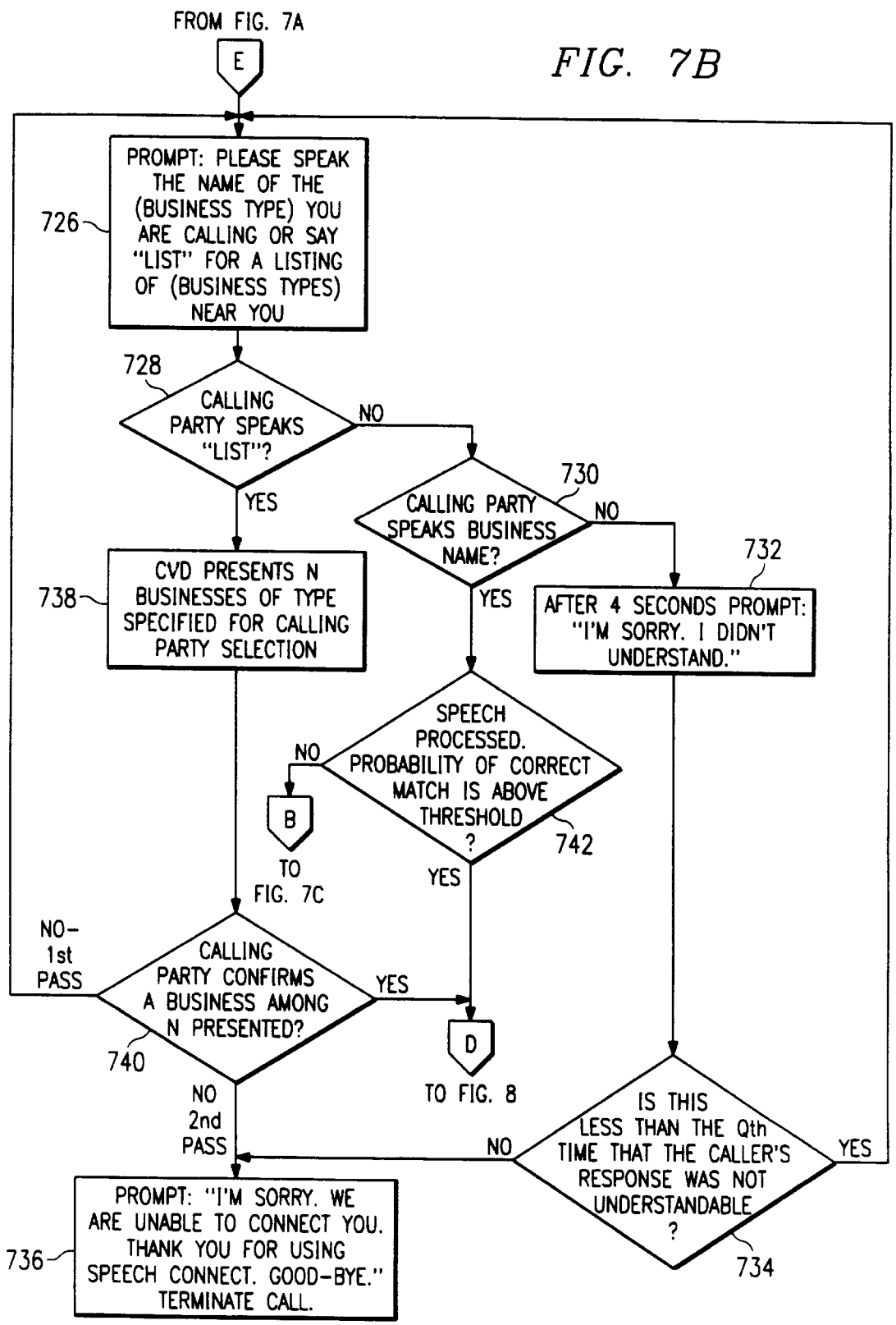

In contrast, if the match is to a business type, CVD then interrogates the calling party to determine the specific callname of the business within this type that the calling party desires to be connected. With further reference to FIG. 7B, therefore, CVD prompts the calling party to speak the specific callname of a business to be connected to, or to say "List" for a listing of businesses of the selected business type located near the calling party (Block 726). If the calling party says nothing after a predetermined period (for example, four seconds), CVD prompts the calling party again either to speak a specific callname or to say "List" (Block 732). If the calling party makes no response after a predetermined number of additional prompts, and advantageously two more prompts, then CVD terminates the call (Blocks 734 and 736).

Let it now be assumed that the calling party says "List" in response to the prompt in Block 726. CVD identifies one or more businesses that are available to the calling party in his/her location, and then lists them to the calling party (Blocks 728 and 738). Ideally, the list to be presented to the calling party will not be more than 5 items long, although the present invention is not specific to a particular number of items. The listing process is advantageously accomplished by interactive voice response, in which CVD replays the names of businesses on its list, and after each one, gives the calling party an opportunity to speak "Yes" or "No". It will be understood that the calling party may also respond by a medium other than voice, such as DTMF from the calling party's telephone device. With each successive "No" before a "Yes," CVD recites the next business on the list. If the calling party responds "No" to every line-of-business title on the list, then CVD gives the calling party another opportunity to either speak the desired specific callname or to say "List" again (Block 740). Of course, the calling party may also disconnect at this point. If the calling party responds "No" to every business offered a second time, CVD informs the calling party that it is unable to complete the call, and then terminates the call (Block 736). Although not illustrated, it will also be understood that instead of terminating the call, CVD may also refer the calling party to a telephone directory, or suggest that the calling party hold for a live directory assistance operator.

Returning to Block 740, let it now be assumed that the calling party responds "Yes" to one of the businesses titles offered in the list. In this case, CVD processes the call as further described below with reference to FIG. 8.

Let it now be assumed that in response to the prompt in Block 726, the calling party speaks a specific callname of a business to which he/she desires to be connected (Block 730). Analogous to Blocks 720 and 722, CVD processes the speech received against its database, as previously compartmentalized according to intelligent processing features described in detail further below, to find a match to a specific callname of a business on file (Block 742). If a match is made with better than a predetermined threshold of "fit", again advantageously 98%, then processing continues as further described below with reference to FIG. 8 (also Block 742).

On the other hand, if CVD cannot make a match better than the predetermined threshold, then it attempts to make a match using a replay/confirmation methodology, analogous to when the calling party's response to the initial prompt in Blocks 710 or 714 could not be matched in Blocks 720 or 722 better than the predetermined threshold of fit. With further reference to FIG. 7C, therefore, CVD first compiles a list of specific callnames in its database, as compartmentalized according to prior processing, and advantageously organizes this list in decreasing order of match "fit" (Block 744). CVD then replays these callnames sequentially, starting with the best match, pausing after each one to ask the calling party to confirm whether the particular match is the desired callname (also Block 744). If the calling party responds "No" to every callname that CVD has compiled on its list, then on the first complete no-match, the calling party is given another opportunity to speak the name of the callname or business type of the party desired to be connected to (Blocks 748 and 750). In being given the opportunity to try again, CVD may advantageously also suggest to the calling party that if it was having trouble locating a particular callname, it might have better success if the calling party first stated the business type in which the callname might be found (Block 750). Also, it is possible that the calling party might prefer to disconnect rather than try again, or be referred to a telephone directory or a live operator.

Returning to Block 746, if the calling party has responded "No" to every callname offered by CVD, and this is the second complete no-match, then CVD informs the calling party that the call cannot be completed, and disconnects the call (Block 752). Alternatively, as already noted, CVD may refer the calling party to a telephone directory or suggest to the calling party to hold for a live directory assistance operator.

Returning now to Block 744, let it be assumed that the calling party responds "Yes" to one of the callnames offered by CVD in the list of those that matched the original instruction spoken by the calling party. CVD continues with processing as set forth immediately below with reference to FIG. 8.

Figure 8:
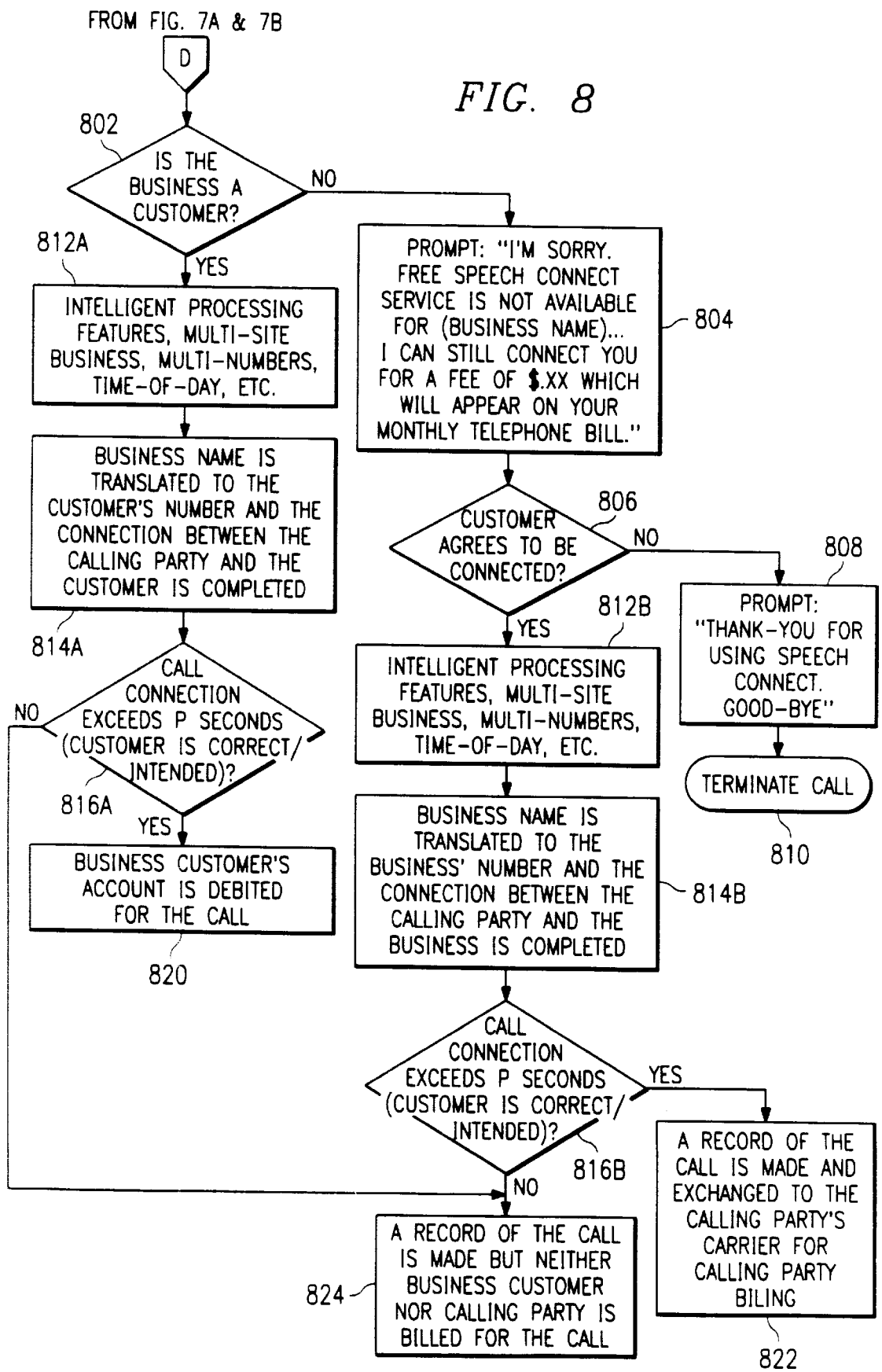
FIG. 8 is a flow chart describing the third part of the call flow logic of the present invention.

Turning now to FIG. 8, it is assumed that CVD has now identified the calling party's utterance to a specific callname on file in the CVD database. It should be noted at this point that the CVD database may contain callnames associated with all kinds of businesses, including businesses that subscribe to the CVD service and others that do not.

It will be further appreciated that some subscribing businesses with callnames in the CVD database may also have special processing features that may assist yet further in connecting the calling party to the business desired. FIG. 8 illustrates call flow logic in which differentiation is first made between a callname identified to a CVD subscriber (for which processing the subscriber advantageously pays) and to a non-subscriber (for which processing the calling party advantageously pays) (Blocks 802 and 804). In a situation in which the calling party will be required to pay, CVD initially informs the calling party of this, and gives the calling party the option to terminate the call if he/she does not wish to pay for the connection (Blocks 806, 808 and 810).

CVD then applies intelligent processing features, where applicable, in translating the previously-identified callname to a specific POTS or 800 number on file to connect to (Blocks 812A and B, Blocks 814A and B). In many cases, there will be only one number on file for the business, and so no special processing will apply. In the case of multi-site businesses, however, CVD may associate the ANI or Zip Code of the calling party to the business site nearest the geographic origin of the calling party. Alternatively, CVD may determine whether the current time of day is within the business' normal operating hours. Alternatively again, CVD may provide the calling party with a menu selection of optional departments within a large multi-department business with multiple CVD numbers on file.

Once the callname has been translated into a number and a connection has been made, CVD then monitors to determine whether the call exceeds a predefined short period in length, such as 5 seconds (Blocks 816A and B), and if so, assumes that the connection is correct and the business is as intended by the calling party. In this case, if the business is a CVD subscriber, the billing account for the business is debited for the call (Block 820). If the business is not a subscriber, and the calling party has agreed to pay for the connection, then a record of the call is made and is exchanged to the calling party's carrier for calling party billing (Block 822).

On the other hand, if the connection lasts less than the predefined short period, CVD assumes that the customer is either incorrect or not the calling party's intended connection, in which case a record of the call is made, but neither the business nor the calling party is billed for the call (Block 824).

CVD accumulates call activity information centrally. Periodic billing statements are sent to subscribers. Advantageously, these billing statements detail CVD usage in formats that are useful to the subscribers in evaluating call traffic demographics.

It has been mentioned above in reference to one or more preferred embodiments herein that CVD may also have intelligence at its disposal to improve the precision with which it recognizes a calling party's voice command and identifies it to a terminating party. As discussed above, and now with reference to FIG. 1, this intelligence takes the form of software and data at the disposal of IPC Host 8 at CVD SN/SCP 11. Further, also as discussed above in reference to FIGS. 6 and 7, this intelligence may come into play in the CVD call flow once the calling party's ANI or other identifier has been recognized (Block 610), and/or when the calling party has spoken a command (Blocks 720 and 748), or when a series of callnames or types of business is being compiled to offer to the calling party for confirmation (Blocks 738 and 744).

An aspect of this intelligence is recognizing that as more and more CVD subscribers become part of the system, it becomes less and less practical for all calling parties accessing CVD to have all CVD subscribers available to them. First, if all CVD subscribers are available to all calling parties, the number of comparisons required between a calling party's utterance and the CVD callnames on file will grow exponentially as use of the system grows. This will place high demands on processing capabilities and will tend to increase response times. Further, if decentralized CVD SCPs are deployed such as shown in reference to FIG. 6, there will necessarily be excessive redundancy of stored information.

Moreover, it plainly is not even necessary for all calling parties to have access to all CVD subscribers. For example, a calling party in New York is highly unlikely to call a plumber in Dallas, and vice versa.

It therefore will be appreciated that the overall database of CVD subscribers may usefully be divided into subsets appropriate to a particular calling party, or groups thereof. Nationally available CVD subscribers, such as international airline companies, will be available in all subsets. Other less nationally available CVD subscribers will be available only in those subsets that are associated with calling parties, or groups thereof, who may reasonable be likely to contact those subscribers, based on geographic location or other indicia.

Figures 7C, 9:
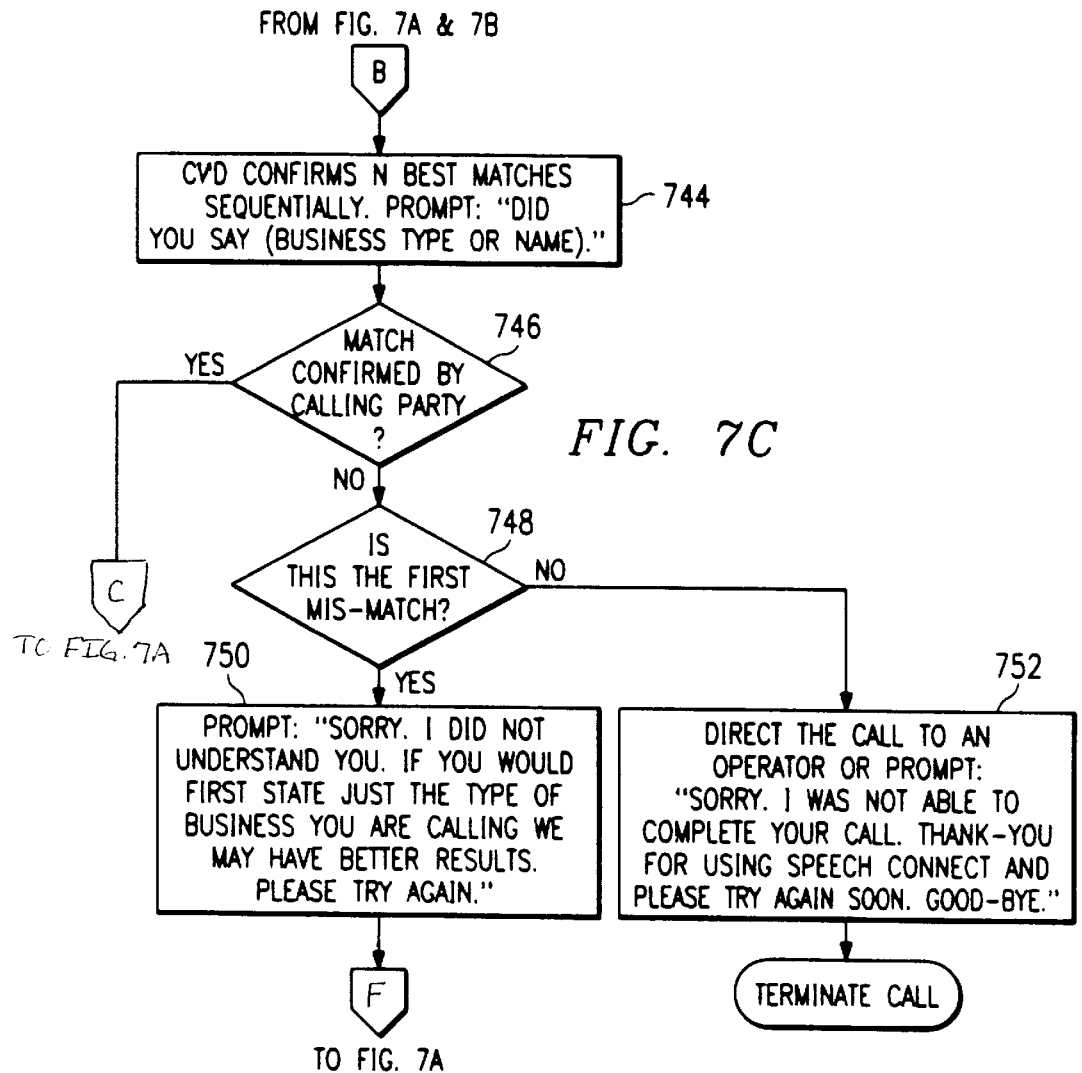
FIG. 9 is a diagram illustrating how intelligence within CVD may select subscribers geographically appropriate to a particular calling party.

FIG. 9 illustrates exemplary categorization of a CVD subscriber database into subsets consistent with the foregoing principles. In FIG. 9, subsets of auto repair and auto rental CVD subscribers have been organized according to ANI, which may be used conveniently to identify the approximate geographic origin of most calls. It will be understood, however, that the present invention is expressly not limited to the use of ANI as a basis for creating subsets. Zip codes or any other demographic indicia of the call may also be used to develop database subsets for the purpose of associating groups of calling parties with the CVD subscribers they are most likely to call.

Let it be assumed in FIG. 9 that CVD has recognized that the calling party is seeking a type of business 910 with "Auto Repair" as the title. CVD has also recognized by ANI that the calling party has originated from an (Area Code)-NXX of (212)-224 (item 920). Accordingly, CVD identifies a database subset 915 that is associated with (212)-224. Subset 915 contains national CVD subscribers Goodyear, Firestone, Sears and Walmart, which are all national auto repair centers with outlets near most calling parties nationwide. Subset 915 also associates A 1 Auto Repair and Car Care, which are local auto repair CVD subscribers nearby to (212)-224, but not to other (Area Code)-NXX combinations. Note also that other local auto repair CVD subscribers such as Mel's Garage and Al's Automotive are not nearby to (212)-224, and so therefore are not associated with subset 915. When CVD attempts to find a match with the calling party's spoken callname, therefore, as in Block 720 as shown on FIG. 7A, the intelligence within CVD has already directed the call to subset 915, based on ANI analysis as shown in block 610 on FIG. 6 and subsequent recognition of the "Auto Repair" business type.

It will also be seen on FIG. 9 that the calling party may identify a CVD subscriber 925 directly by name (e.g. "Avis") without going through the type-of-business call flow. Again, since CVD associates national auto rental subscribers with all (Area Code)-NXX combinations, it will also be seen that "Avis" may be found in subset 915 regardless of any other, local auto rental subscribers that may also be associated with subset 915.

A further basis on which to create useful subsets of the CVD database is the calling party's own calling history. By tracking and logging data regarding the calling patterns made by individual calling parties, or groups thereof, calling patterns will emerge that may be used to define "archival" subsets of the CVD subscriber database. Cross-referencing a historical subset with national/local subsets as shown in FIG. 9, will better define a group of CVD subscribers likely to match a spoken callname received from a particular calling party. It will also be understood that calling pattern analysis may be used at both an individual level and a group level to facilitate identification of useful historical subsets.

A still further basis on which to create useful subsets of the CVD database is by associating "pointer" words, recognized from the calling party's utterance, with groups of business types categorized on the database. It will be understood that "pointer" words refer to certain key words in language that characterize some business types and not others. For example, "agency" is a pointer word that could often be associated with "travel," "real" estate" or "advertising," but rarely, if ever, with "restaurant," "bank" or "car dealer." Thus, recognition of pointer words may be used to further limit or compartmentalize subsets of CVD subscribers potentially likely to be of interest to a calling party. Further examples of "pointer" words are illustrated below in Table 1:

TABLE 1

| POINTER WORD | INCLUDES | EXCLUDES |
|---|---|---|
| Broker | Stock | Auto Repair |
|  | Real Estate | Restaurant |
|  | Pawn | Swimming Pool |
| Repair | Auto | Bank |
|  | Appliance | Travel |
|  | Home | Insurance |
| Firm | Accounting | Plumber |
|  | Law | Grocery |
|  | Consulting | Pharmacy |

Accordingly, CVD uses intelligence to recognize pointer words in the calling party's utterances. Advantageously, this may be done at any time during a CVD call when utterances are received from the calling party. CVD may then use the recognized pointer words henceforth from that point in the call to facilitate connection to the desired terminating party.

For example, with reference to FIG. 7A, CVD will ideally recognize pointer words from the calling party's original utterance in Blocks 710 or 712. Alternatively, CVD may recognize pointer words from an utterance made in response to the offer of a list of callnames at Block 726 on FIG. 7B.

Once pointer words are recognized, the advantage thereof may be appreciated by further reference to FIG. 9. As disclosed above, ANI will have identified a series of subsets according to (Area Code-NXX combinations 920, and these subsets are further categorized by type of business 910. Pointer word identification will further compartmentalize type-of-business categories 910 according to language associations as illustrated above in Table 1.

In this way, the vocabulary of likely CVD subscribers who must be matched with the calling party's spoken callname is reduced, thereby optimizing processing power demands and response times. The precision with which a spoken callname is matched to a CVD subscriber is also likely to be enhanced.

A numerical example may also be illustrative. Experimentation suggests that the entire CVD database, when fully deployed, may contain in excess of 10,000,000 callnames for CVD subscribers both national and local. It is expected that ANI association will compartmentalize this database into 200,000 to 500,000 callnames as likely to be of interest to any particular calling party.

Now let it be assumed that in initial voice interaction with the calling party, CVD recognizes the pointer word "bank" in a received utterance. By rejecting those types of businesses for which "bank" is an extremely unlikely word association, it is now expected that no more than 10,000 callnames in the database are likely to be of interest to the calling party.

CVD may now process either a spoken callname against these 10,000 vocabulary callnames directly, or may go through the step of type-of-business identification first. According to the disclosure above, of course, if initial direct comparison of callnames is unsuccessful, then CVD will default to the type-of-business identification step anyway.

Either way, advantages in the optimization of call processing are evident. If there is an initial direct callname comparison, this comparison is made against 10,000 vocabulary callnames, which in the example represents 0.1% of the total CVD database. Moreover, if there is a type-of-business identification either initially or later, the vocabulary of potential callnames is likely to decrease yet further.

CVD intelligence further increases the effectiveness of the system by recognizing various accents and speech patterns of the calling party. Sensitivity to accents and speech patterns not only improves ASR generally, but may assist in the improved definition of geographical or historical subsets as described above.

Clearly, one easy accent/speech pattern distinction to make is with reference to tongue. Although not specifically discussed with reference to FIGS. 6, 7 and 8 above, those of skill in this art will appreciate that it would be advantageous to add a step in the CVD call flow where the calling party may say, for example, "Español" or "Deutsch," at which point all prompts and voice responses from that point on will be in that particular tongue. It will be further appreciated that if CVD is now operating in that tongue, its intelligence may also adapt it, or "tune" it, to recognize particular CVD subscriber callnames spoken in an accent or speech pattern consistent with calling parties who regularly speak in that tongue. Voice recognition precision will thus be improved.

Moreover, once the calling party has identified himself or herself to CVD as a person who regularly speaks in a particular tongue, CVD may then associate one or more subsets of its subscriber database to the calling party. These subsets may include historical subsets derived from the calling patterns of speakers of that tongue, or geographical subsets based on dialects recognized within that tongue, or known locations where groups of that nationality are known to live and/or work. These ethnic subsets may then be cross referenced, as described above, with geographic and historical subsets for the calling party to better define a group of CVD subscribers likely to match a spoken callname received from a particular calling party.

It will be further understood that this "ethnic" intelligence is not limited to distinctions based on recognition of multiple tongues. It is well known in the art that many accents and speech patterns in the same language may be associated with people indigenous to various regions. CVD intelligence is also disposed to recognize and tune itself to particular regional accents, thereby improving precision in speech recognition and rapid CVD subscriber matching in the same way as for different languages as described above. For example, when CVD recognizes a call as originating from West Texas, it may expect accent/speech patterns consistent with calling parties indigenous to that area and may adapt speech pattern recognition accordingly.

A further attribute of CVD intelligence recognizes that calling parties may be accessing the system from a variety of communications devices, many of which have their own voice transmission peculiarities. For example, to the human ear, a word spoken on a mobile telephone may often sound different from the same word spoken on a land line telephone. Further, it is well known that telephones come in various grades of quality, and the same word spoken over different telephones may sound different depending on fidelity and interference levels. Such peculiarities may be characterized as a "communications device signature." CVD is sensitive to and adapts itself to communications device signatures. Once the system detects a transmission peculiarity indicative that a particular communications device is being used, it then "tunes" itself to expect other adaptations of speech patterns normally characteristic of that device. CVD may then identify a CVD subscriber with enhanced precision.

A still further attribute of CVD intelligence recognizes the need also to subsequently "filter out" speech characteristics (such as tongue, dialect, accent or communications devices signature, as described above) in comparing the calling party's utterances to callnames and/or business types stored in the CVD database. It will be appreciated that while it is advantageous to recognize these speech characteristics and then use said recognition to compartmentalize the database and improve speech recognition precision, subsequent comparison against stored callnames and/or business types will in fact be enhanced if the speech characteristic can be compensated for. Accordingly, CVD advantageously makes this compensation by filtering out recognized speech characteristics prior to comparing callnames against the calling party's utterances.

It will be further understood that many of the features described above may be embodied on software executable on a computer with a central processing unit, a memory and advantageously one or more display devices. Such features include all aspects of the CVD intelligence described above, and all aspects of call flow logic and control performed by components of the CVD SCP as illustrated in insets C of FIGS. 3, 4 and 5.

Although the present invention and its advantages have been described in detail, it should be understood that various changes, substitutions and alterations can be made herein without departing from the spirit and scope of the invention as defined by the appended claims.

We claim:

1. A method for connecting a calling party in a telecommunications network according to one or more utterances of the calling party during a call, said method comprising:
   pre-storing a unique callname for each of a plurality of terminating parties, each of the callnames being independent of the calling party;
   associating pointer words with combinations of the callnames;
   receiving a signal from the calling party, said signal including signal information that includes the calling party's utterances and non-speech data;
   compartmentalizing the plurality of stored callnames at the time of the call to identify a subset of at least two of the stored callnames based on the non-speech data;
   recognizing one of the stored callnames in the subset based on the calling party's utterances, and
   connecting the calling party to the terminating party corresponding to the recognized callname.

2. The method of claim 1, in which the step of compartmentalizing further includes:
   compartmentalizing said subset based on one or more of the pointer words recognized in the calling party's utterances.

3. The method of claim 1, in which the step of associating includes the substep of associating callname categories with combinations of said callnames, and in which the step of compartmentalizing further includes:
   compartmentalizing said subset based on one or more callname categories recognized in the calling party's utterances.

4. The method of claim 1, in which the step of associating includes the substep of associating callname categories with combinations of said callnames, and in which the step of recognizing includes the substep of identifying a stored callname or a callname category that matches the calling party's utterances within a predetermined threshold minimum fit.

5. The method of claim 4, in which the predetermined threshold minimum fit is 98%.

6. The method of claim 4, in which the step of recognizing further includes the substeps of:
   when no stored callname or callname category in the subset matches utterances of the calling party within the predetermined threshold minimum fit, sequentially playing back a preselected number of playback candidates to the calling party, said playback candidates consisting of stored callnames or callname categories in the subset that match the calling party's utterances with less than the predetermined threshold minimum fit; and
   after each playback candidate thus played back, confirming with the calling party whether the playback candidate that was just played back corresponds to the calling party's utterances.

7. The method of claim 6, in which the preselected number of playback candidates played back is no more than 5.

8. The method of claim 6, in which playback candidates are sequentially played back in decreasing degree of fit with the calling party's utterances.

9. The method of claim 6, in which the step of recognizing further includes the substeps of:
   upon confirmation by the calling party of a playback candidate, determining whether said confirmed playback candidate is a stored callname or a callname category;
   if a callname category, listing a predetermined number of preselected callnames from the subset within the confirmed callname category; and
   after each stored callname thus listed, confirming with the calling party whether the callname that was just played back corresponds with a terminating party to which the calling party desires to be connected.

10. The method of claim 9, in which the predetermined number of preselected callnames is no more than 5.

11. The method of claim 9, in which the callnames to be listed are preselected to facilitate connection of the calling party with terminating parties located geographically nearby.

12. The method of claim 1, in which the calling party's utterances include a callname but not a callname category, and in which the step of recognizing includes the substep of:
   suggesting to the calling party to further utter a desired callname category upon failure to match one of the stored callnames in the subset to said uttered callname with better than a predetermined threshold minimum fit.

13. The method of claim 12, in which the predetermined threshold minimum fit is 98%.

14. The method of claim 1, in which the step of connecting includes the substep of determining whether the calling party will be tolled for said connection.

15. The method of claim 14, in which, if the calling party is to be tolled for said connection, the step of connecting further includes the substep of informing the calling party thereof.

16. The method of claim 15, in which said informing substep includes the substep of stating the expected toll for said connection.

17. The method of claim 15, in which said informing substep is performed prior to making said connection.

18. The method of claim 1, in which the non-speech data includes information identifying the geographic location from which the signal originates.

19. The method of claim 1, in which a signal may be received from any calling party connected to the U.S. Public Switched Telephone Network.

20. The method of claim 1, in which the step of compartmentalizing includes the substep of adapting said subset according to pre-stored statistical data.

21. The method of claim 1, in which the step of compartmentalizing includes the substep of adapting said subset according to speech characteristics recognized in the calling party's utterances.

22. The method of claim 21, in which said speech characteristics include one or more speech characteristics selected from the group consisting of:
- (a) tongue;
- (b) dialect;
- (c) accent; and
- (d) communications device signature.

23. The method of claim 21, in which the step of recognizing includes the substep of filtering out said recognized speech characteristics in comparing stored callnames with said received signal information.

24. A computer program product having a computer readable medium on which computer readable logic is recorded for connecting a calling party in a telecommunications network according to one or more utterances of the calling party during a call, the telecommunications network including a processor, a memory, and a display device, the computer program product comprising:
- means for pre-storing a unique callname for each of a plurality of terminating parties, each of the callnames being independent of the calling party;
- means for associating pointer words with combinations of the callnames;
- means for receiving a signal from the calling party, said signal including signal information that includes the calling party's utterances and non-speech data;
- means for compartmentalizing the plurality of stored callnames at the time of the call to identify a subset of at least two of the stored callnames based on the non-speech data;
- means for recognizing one of the stored callnames in the subset based on the calling party's utterances; and
- means for connecting the calling party to the terminating party corresponding to the recognized callname.

25. The computer program product of claim 24, in which the means for compartmentalizing further includes:
- means for subsequently compartmentalizing said subset based on one or more of the pointer words recognized in the calling party's utterances.

26. The computer program product of claim 24, in which the means for associating includes means for associating callname categories with combinations of said callnames, and in which the means for compartmentalizing further includes:
- means for subsequently compartmentalizing said subset based on one or more callname categories recognized in the calling party's utterances.

27. The computer program product of claim 24, in which the means for associating includes means for associating callname categories with combinations of said callnames, and in which the means for recognizing includes means for identifying a stored callname or a callname category that matches the calling party's utterances within a predetermined threshold minimum fit.

28. The computer program product of claim 27, in which the predetermined threshold minimum fit is 98%.

29. The computer program product of claim 27, in which the means for recognizing further includes:
- means for sequentially playing back a preselected number of playback candidates to the calling party when no stored callname or callname category in the subset matches utterances of the calling party within the predetermined threshold minimum fit; said playback candidates consisting of stored callnames or callname categories in the subset that match the calling party's utterances with less than the predetermined threshold minimum fit; and
- means for confirming with the calling party after each playback candidate thus played back whether the playback candidate that was just played back corresponds to the calling party's utterances.

30. The computer program product of claim 29, in which the preselected number of playback candidates played back is no more than 5.

31. The computer program product of claim 29, in which playback candidates are sequentially played back in decreasing degree of fit with the calling party's utterances.

32. The computer program product of claim 29, in which the means for recognizing further includes:
- means for determining, upon confirmation by the calling party of a playback candidate, whether said confirmed playback candidate is a stored callname or a callname category;
- means for listing a predetermined number of preselected callnames from the subset within the confirmed callname category, said means for listing responsive to a determination that said confirmed playback candidate is a callname category; and
- means for confirming with the calling party after each stored callname thus listed whether the callname that was just played back corresponds with a terminating party to which the calling party desires to be connected.

33. The computer program product of claim 32, in which the predetermined number of preselected callnames is no more than 5.

34. The computer program product of claim 32, in which the callnames to be listed are preselected to facilitate connection of the calling party with terminating parties located geographically nearby.

35. The computer program product of claim 24, in which the calling party's utterances include a call name but not a callname category, and in which the means for recognizing includes:
- means for suggesting to the calling party to further utter a desired callname category upon failure to match one of the stored callnames in the subset to said uttered callname with better than a predetermined threshold minimum fit.

36. The computer program product of claim 35, in which the predetermined threshold minimum fit is 98%.

37. The computer program product of claim 24, in which the means for connecting includes means for determining whether the calling party will be tolled for said connection.

38. The computer program product of claim 37, in which, if the calling party is to be tolled for said connection, the means for connecting further includes means for informing the calling party thereof.

39. The computer program product of claim 38, in which the means for informing includes means for stating the expected toll for said connection.

40. The computer program product of claim 38, in which the calling party is informed prior to making said connection.

41. The computer program product of claim 24, in which the non-speech data includes information identifying the geopgraphic location from which the signal originates.

42. The computer program product of claim 24, in which a signal may be received from any calling party connected to the U.S. Public Switched Telephone Network.

43. The computer program product of claim 24, in which the means for compartmentalizing includes means for adapting said subset according to pre-stored statistical data.

44. The computer program product of claim 24, in which the means for compartmentalizing includes means for adapting said subset according to speech characteristics recognized in the calling party's utterances.

45. The computer program product of claim 24, in which said speech characteristics include one or more speech characteristics selected from the group consisting of:
  (a) tongue;
  (b) dialect;
  (c) accent; and
  (d) communications device signature.

46. The computer program product of claim 44, in which the means for recognizing includes means for filtering out said recognized speech characteristics in comparing stored callnames with said received signal information.

47. In a telecommunications network, a service control point to which a signal incoming from a calling party may be directed, said incoming signal including signal information that includes one or more utterances of the calling party and non-speech data, the service control point being capable of setting up a connection in the telecommunications network according to said utterances of the calling party, the service control point comprising:
  a switch;
  a resource platform, the resource platform including means for interactive speech recognition and response;
  an intelligent peripheral controller;
  means for maintaining the switch, the resource platform and the intelligent peripheral controller in data communication with each other; and
  the switch, the resource platform and the intelligent peripheral controller in combination further comprising:
  means for pre-storing a unique callname for each of a plurality of terminating parties, each of the callnames being independent of tie calling party;
  means for associating pointer words with combinations of the callnames;
  means for receiving said incoming signals;
  means for compartmentalizing the plurality of stored callnames at the time of the call to identify a subset of at least two of the stored callnames based on the non-speech data;
  means for recognizing one of the stored callnames in the subset based on the received calling party's utterances; and
  means for connecting the calling party to the terminating party corresponding to the recognized callname.

48. The service control point of claim 47, in which the means for compartmentalizing further includes:
  means for subsequently compartmentalizing said subset based on one or more of the pointer words recognized in the calling party's utterances.

49. The service control point of claim 47, in which the means for associating includes means for associating callname categories with combinations of said callnames, and in which the means for compartmentalizing further includes:
  means for subsequently compartmentalizing said subset based on one or more callname categories recognized in the calling party's utterances.

50. The service control point of claim 47, in which the means for associating includes means for associating callname categories with combinations of said callnames, and in which the means for recognizing includes means for identifying a stored callname or a callname category that matches the calling party's utterances within a predetermined threshold minimum fit.

51. The service control point of claim 50, in which the predetermined threshold minimum fit is 98%.

52. The service control point of claim 50, in which the switch, the resource platform and the intelligent peripheral controller in combination further comprise:
  means for sequentially playing back a preselected number of playback candidates to the calling party when no stored callname or callname category in the subset matches utterances of the calling party within the predetermined threshold minimum fit, said playback candidates consisting of stored callnames or callname categories in the subset that match the calling party's utterances with less than the predetermined threshold minimum fit; and
  means for confirming with the calling party after each playback candidate thus played back whether the playback candidate that was just played back corresponds to the calling part's utterances.

53. The service control point of claim 52, in which the preselected number of playback candidates played back is no more than 5.

54. The service control point of claim 52, in which playback candidates are sequentially played back in decreasing degree of fit with the calling party's utterances.

55. The service control point of claim 52, in which the means for recognizing further includes:
  means for determining, upon confirmation by the calling party of a playback candidate, whether said confirmed playback candidate is a stored callname or a callname category;
  means for listing a predetermined number of preselected callnames from the subset within the confirmed callname category, said means for listing responsive to a determination that said confirmed playback candidate is a callname category; and
  means for confirming with the calling party after each stored callname thus listed whether the callname that was just played back corresponds with a terminating party to which the calling party desires to be connected.

56. The service control point of claim 55, in which the predetermined number of preselected callnames is no more than 5.

57. The service control point of claim 55, in which the callnames to be listed are preselected to facilitate connection of the calling party with terminating parties located geographically nearby.

58. The service control point of claim 47, in which the calling party's utterances include a callname but not a callname category, and in which the means for recognizing includes:

means for suggesting to the calling party to further utter a desired callname category upon failure to match one of the stored callnames in the subset to said uttered callname with better than a predetermined threshold minimum fit.

59. The service control point of claim 58, in which the predetermined threshold minimum fit is 98%.

60. The service control point of claim 47, in which the means for connecting includes means for determining whether the calling party will be tolled for said connection.

61. The service control point of claim 60, in which, if the calling party is to be tolled for said connection, the means for connecting further includes means for informing the calling party thereof.

62. The service control point of claim 61, in which the means for informing includes means for stating the expected toll for said connection.

63. The service control point of claim 61, in which the calling party is informed prior to making said connection.

64. The service control point of claim 47, in which the non-speech data includes information identifying the geographic location from which the signal originates.

65. The service control point of claim 27, in which a signal may be received from any calling party connected to the U.S. Public Switched Telephone Network.

66. The service control point of claim 27, in which the means for compartmentalizing includes means for adapting said subset according to pre-stored statistical data.

67. The service control point of claim 47, in which the means for compartmentalizing includes means for adapting said subset according to speech characteristics recognized in the calling party's utterances.

68. The service control point of claim 67, in which said speech characteristics include one or more speech characteristics selected from the group consisting of:

(a) tongue;

(b) dialect;

(c) accent; and (d) communications device signature.

69. The service control point of claim 47, in which the means for recognizing includes means for filtering out said recognized speech characteristics in comparing stored callnames with said received signal information.

70. The service control point of claim 47, in which the means for maintaining the switch, the resource platform and the intelligent peripheral controller in data communication with each other is an ethernet.

71. A method for connecting a calling part in a telecommunications network according to one or more utterances of the calling party during a call, said method comprising:

pre-storing a unique H e for each of a plurality of terminating parties, each of the callnames being independent of the calling party;

associating pointer words with combinations of the callnames;

receiving a signal that includes the calling party's utterances from the calling party;

screening the calling party based on prior interaction by the calling party to determine whether to permit the calling party to proceed;

recognizing one of the stored callnames in the calling party's utterances when the calling party is permitted to proceed; and connecting the calling party to the terminating party corresponding to the recognized callname.

72. A method for connecting a calling party in a telecommunications network according to one or more utterances of the calling party during a call, said method comprising:

pre-storing a unique callname for each of a plurality of terminating parties, each of the callnames being independent of the calling party;

associating pointer words with combinations of the callnames;

receiving a signal that includes the calling party's utterances from the calling party;

screening the calling party based on prior interaction by the calling party to determine whether to permit the calling party to proceed;

recognizing one of the stored callnames in the calling party's utterances when the calling party is permitted to proceed;

determining that the recognized callname corresponds to multiple locations of the terminating party;

determining a location of the terminating party closest to the calling part; and connecting the calling party to the terminating party corresponding to the recognized callname at the determined location.

* * * * *